United States Patent
Liu et al.

(10) Patent No.: US 11,345,033 B2
(45) Date of Patent: May 31, 2022

(54) CONTROL METHOD OF MOVING BODY AND CONTROL SYSTEM OF MOVING BODY

(71) Applicant: NIDEC CORPORATION, Kyoto (JP)

(72) Inventors: Chun-Hsien Liu, Taipei (TW); Bo Yi Li, Taipei (TW); Sheng-Jen Chen, Taipei (TW); Chih-Hsiang Chen, Taipei (TW); Yung-Chih Pan, Taipei (TW); Chi-Ying Lee, Taipei (TW)

(73) Assignee: NIDEC CORPORATION, Kyoto (JP)

( * ) Notice: Subject to any disclaimer, the term of this patent is extended or adjusted under 35 U.S.C. 154(b) by 204 days.

(21) Appl. No.: 16/575,417

(22) Filed: Sep. 19, 2019

(65) Prior Publication Data
US 2020/0094409 A1  Mar. 26, 2020

(30) Foreign Application Priority Data
Sep. 21, 2018  (CN) .......................... 201811109659.5

(51) Int. Cl.
| B25J 9/16 | (2006.01) |
| G05D 1/02 | (2020.01) |
| B25J 1/00 | (2006.01) |
| B25J 11/00 | (2006.01) |

(52) U.S. Cl.
CPC .......... *B25J 9/1666* (2013.01); *G05D 1/0214* (2013.01); *A47L 2201/04* (2013.01); *B25J 11/008* (2013.01)

(58) Field of Classification Search
CPC ...... B25J 9/1666; B25J 11/008; B25J 9/1612; B25J 13/089; G05D 1/0214; G05D 1/0282; G05D 1/0246; G05D 1/0253; G05D 1/0223; G05D 1/0276; G05D 1/0289; A47L 2201/04
See application file for complete search history.

(56) References Cited

U.S. PATENT DOCUMENTS

| 2007/0135962 | A1* | 6/2007 | Kawabe .................. G10L 13/00 700/225 |
| 2012/0185094 | A1* | 7/2012 | Rosenstein .......... G05D 1/0251 700/259 |
| 2016/0188977 | A1* | 6/2016 | Kearns ................. G05D 1/0274 348/113 |
| 2016/0271795 | A1* | 9/2016 | Vicenti ................ G05D 1/0272 |
| 2017/0368685 | A1* | 12/2017 | Lin ....................... G05D 1/0242 |
| 2018/0020893 | A1* | 1/2018 | Lee ........................ A47L 9/2826 701/28 |
| 2018/0038697 | A1* | 2/2018 | Li ......................... G05D 1/0225 |
| 2018/0134207 | A1* | 5/2018 | Kentley-Klay ...... G05D 1/0257 |
| 2019/0094866 | A1* | 3/2019 | Moore ................. G05D 1/0278 |
| 2019/0240833 | A1* | 8/2019 | Kimura .................. B25J 9/1664 |

* cited by examiner

*Primary Examiner* — Abby Y Lin
*Assistant Examiner* — Dylan M Katz
(74) *Attorney, Agent, or Firm* — JCIPRNET

(57) ABSTRACT

The disclosure provides a control method of a moving body and a control system of a moving body, which allow a control part to calculate a fragment of a moving path between the moving body and a target according to position information of the moving body and the target, and transmit the fragment to the moving body. The above steps are repeatedly executed in sequence until the moving body reaches the target.

16 Claims, 5 Drawing Sheets

CONTROL METHOD OF MOVING BODY AND CONTROL SYSTEM OF MOVING BODY

CROSS REFERENCE TO RELATED APPLICATIONS

The present invention claims priority under 35 U.S.C. § 119 to Chinese Application No. 201811109659.5 filed on Sep. 21, 2018 and the entire content of which is incorporated herein by reference.

Field of the Invention

The disclosure relates to a control method of a moving body and a control system of a moving body.

BACKGROUND

Description of Related Art

In recent years, the technology of using a moving body to carry an article or for guiding has gradually developed. The so-called moving body is, for example, a service robot (but not limited herein). Through the guidance of a navigation system, the moving body may carry an article or guide an object to a destination, or move within a specific area.

For example, a navigation system of a moving body capable of calculating moving paths of multiple moving bodies to predict whether the moving bodies will collide with one another, so as to correct the moving paths is known. A moving robot system capable of measuring a position information of a moving body with the help of a sensing element (such as a sensing label) and setting the moving path of the moving body to the destination accordingly, so as to allow the moving body to move to the destination according to the moving path is known.

However, even though these are capable of calculating the moving path of the moving body and reposition and/or recalculate the moving path when the moving body is misaligned or after avoiding an obstacle, the planning of the moving path is completed by adopting a one-time planning from the current position of the moving body to the destination, so the moving path is still not stable and accurate enough.

SUMMARY

According to an embodiment of the disclosure, a control method of a moving body allows a control part to repeatedly execute the following steps in sequence until a moving body reaches a target. A fragment of a moving path between the moving body and the target is calculated according to position information of the moving body and the target. The fragment is transmitted to the moving body.

The above and other elements, features, steps, characteristics and advantages of the present disclosure will become more apparent from the following detailed description of the preferred embodiments with reference to the attached drawings.

DETAILED DESCRIPTION OF DISCLOSED EMBODIMENTS

Figure 1:
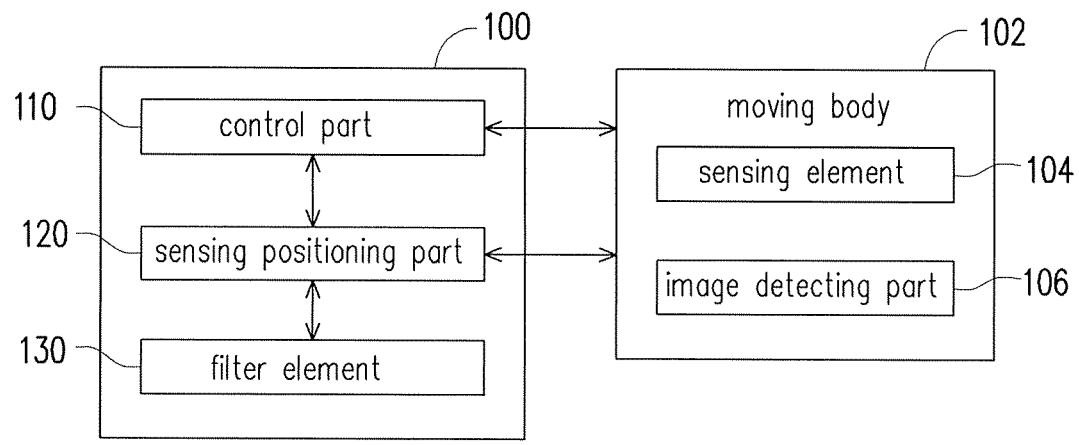
FIG. 1 is a schematic view of a control system of a moving body according to an embodiment of the disclosure.

The drawings are included to facilitate further understanding of the disclosure. The drawings are incorporated in the specification and constitute a part of the specification. The drawings illustrate embodiments of the disclosure and explain principles of the disclosure together with the descriptions.

Exemplary embodiments of the disclosure will now be described in detail with reference to the drawings. Wherever possible, the same or similar parts are denoted by the same reference numerals in the drawings and descriptions.

Figure 2:
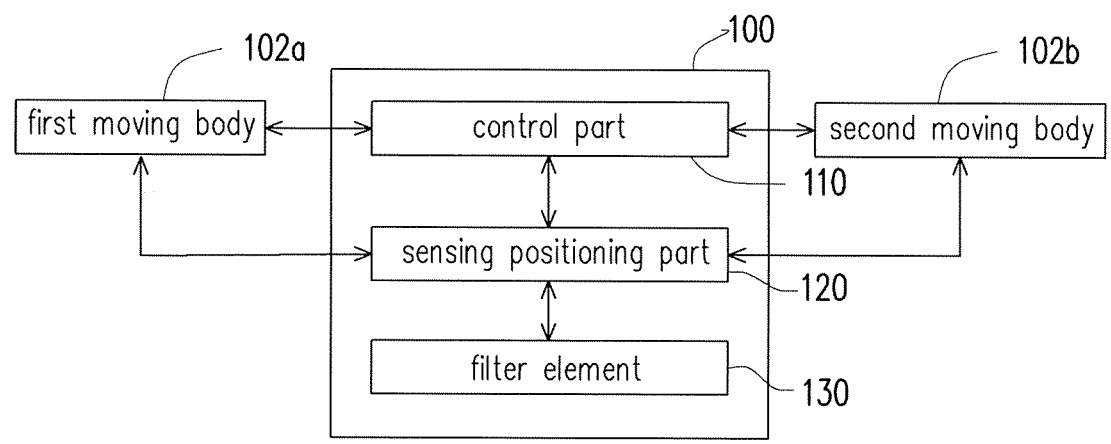
FIG. 2 is a schematic view of a modification of the control system of the moving body of FIG. 1.

FIG. 1 is a schematic view of a control system of a moving body according to an embodiment of the disclosure. FIG. 2 is a schematic view of a modification of the control system of the moving body of FIG. 1. The modification of FIG. 2 is intended to illustrate an embodiment of multiple moving bodies. The rest of the control system of the moving body and the composition of the moving body are similar to the embodiment of FIG. 1. Therefore, the illustration of FIG. 1 may be applied to the modification of FIG. 2, but not limited thereto.

In the embodiment, a control system 100 of the moving body includes a control part 110, which may be communicatively connected to a single moving body 102 as shown in FIG. 1 and may also be communicatively connected to multiple moving bodies 102a and 102b as shown in FIG. 2, to control the moving body 102 or the moving bodies 102a and 102b, so as to move the target. The moving bodies 102, 102a, and 102b are, for example, service robots and the target is, for example, a destination or an object. The service robots as the moving bodies 102, 102a, and 102b may move to a predetermined destination, track an object with a sensing element (such as a sensing label), guide an object to a destination, or move following the object with a sensing element (such as a sensing label), and the aforementioned application modes may be implemented through the following embodiments.

Specifically, referring to FIG. 1, in the embodiment, the control part 110 is configured at a position different from that of the moving body 102. That is, the control part 110 may provide control signals from the back end to the moving body 102. As such, the moving body 102 does not need to be installed with an additional control part and is controlled by the control part 110 from the back end, thereby simplifying the load of the moving body 102. Further, when multiple moving bodies (such as the moving bodies 102a and 102b of the modification of FIG. 2) are adopted, the multiple moving bodies 102a and 102b may be collectively controlled by the control part 110 from the back end, which help in managing and operating the multiple moving bodies 102a and 102b in the same operating environment.

In the embodiment, the control part 110 calculates a fragment of the moving path between the moving body 102 and the target according to the position information of the moving body 102 and the target, and transmits the fragment to the moving body 102, causing the moving body 102 to move in the fragment. Then, the control part 110 repeatedly executes the above steps in sequence until the moving body 102 reaches the target. Accordingly, the control system 100 of the moving body further includes a sensing positioning part 120 which senses and positions the moving body 102 and/or the target to obtain the position information. The position information may be obtained by the sensing positioning part 120 sensing and positioning the moving body 102 and/or the target. Then, the sensing positioning part 120 transmits the position information to the control part 110, allowing the control part 110 to calculate a fragment of the moving path between the moving body 102 and the target accordingly, and transmit the fragment to the moving body 102, causing the moving body 102 to be able to move in the fragment.

In detail, in the embodiment, the sensing positioning part 120 is configured at a position different from the positions of the moving body 102 and the target. That is, the sensing positioning part 120 may sense the moving body 102 and/or the target from the back end. Further, the sensing positioning part 120 senses and positions a sensing element mounted on the moving body 102 and/or the target to obtain the position information of the moving body 102 and/or the target. Further, the sensing positioning part 120 may be further mounted with a filter element 130, for example, a low-pass filter to filter the position information sensed by the sensing positioning part 120. In other words, the clutter accompanying with the position information sensed by the sensing positioning part 120 is filtered out, so that the position information sensed by the sensing positioning part 120 is more accurate. However, the disclosure does not limit the type of the filter element and whether the filter element is configured, and the filter element may be adopted according to requirements.

Furthermore, the moving body 102 is mounted with a sensing element 104, for example, a sensing label. The sensing positioning part 120 senses and positions the sensing element 104 mounted on the moving body 102 to obtain the position information of the moving body 102 (the same for the moving bodies 102a and 102b, but is not limited herein). Then, the sensing positioning part 120 transmits the position information of the moving body 102 to the control part 110. In contrast, the target is a predetermined destination or an object positioned at a fixed point or in a moving state depending on the application. Also, whether to mount a sensing element may be decided according to the application mode of the moving body 102. Corresponding illustration of the application modes is as below.

For example, when the target is, for example, a predetermined destination, the moving body 102 may move to the destination and may also be used to direct an object to the destination. At this time, the destination is, for example, a fixed point established in advance in a map stored in the control part 110, that is, the position information of the destination is already known and it is not required to install an additional sensing element to the destination. After the sensing positioning part 120 transmits the position information of the moving body 102 to the control part 110, the control part 110 calculates a fragment of the moving path between the moving body 102 and the destination as the target according to the position information of the moving body 102 transmitted by the sensing positioning element 120 and the position information of the destination known in advance, and transmits the fragment to the moving body 102, causing the moving body 102 to move in the fragment.

Furthermore, when the target is, for example, an object with a sensing element (for example, a user as the object wearing a wristband or an identification tag mounted with a sensing label), the moving body 102 can track the object positioned at a fixed point and can also follow the object in a moving state. At this time, the sensing positioning part 120 respectively senses and positions the sensing element 104 mounted on the moving body 102 and the sensing element mounted on the object as the target to obtain the position information of the moving body 102 and the object as the target. Then, the control part 110 calculates a fragment of the moving path between the moving body 102 and the object as the target according to the position information of the moving body 102 and the object as the target transmitted by the sensing positioning part 120, and transmits the fragment to the moving body 102, causing the moving body 102 to move in the fragment.

Further, in the embodiment, when the target is, for example, an object with a sensing element, and the moving body 102 is used to follow the object in a moving state, the moving body 102 may further have an image detecting part 106. The image detecting part 106 is, for example, a camera head, but is not limited thereto. The image detecting part 106 is mounted on the moving body 102 and detects a target (for example, an object with a sensing element) within a specific range. In the case where the image detecting part 106 detects the target, the control part 110 calculates the fragment according to the position information of the moving body 102 obtained by the sensing positioning part 120 sensing and positioning the moving body 102, and the position information of the target detected by the image detecting part 106. Thus, the moving body 102 may also move in the fragment to achieve the effect of movement, particularly the effect of movement following the object in the moving state.

Figure 3A:
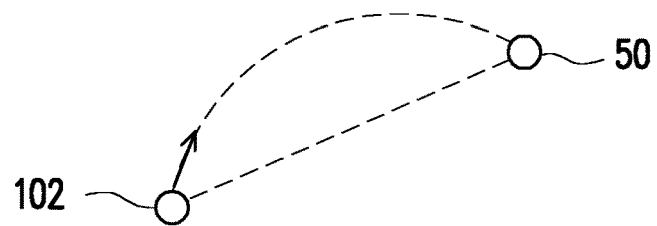
FIG. 3A to FIG. 3E are schematic views of a moving path of the moving body of FIG. 1.
Figure 3B:
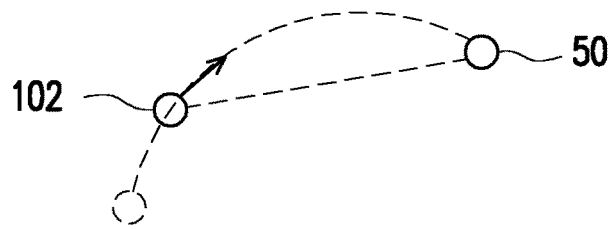
Figure 3C:
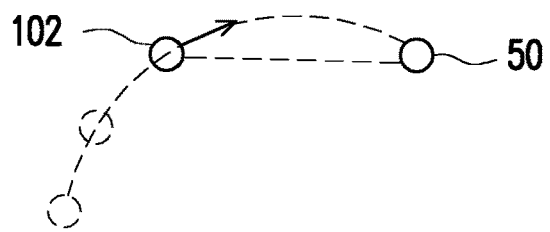
Figure 3D:
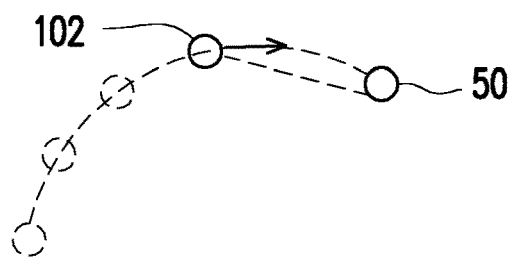
Figure 3E:
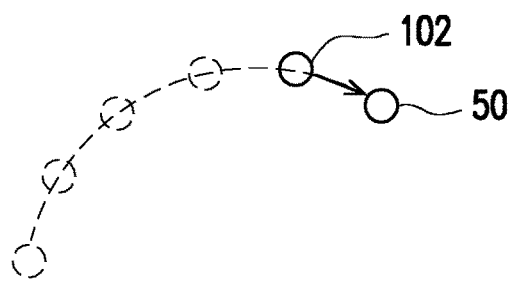
Figure 4:
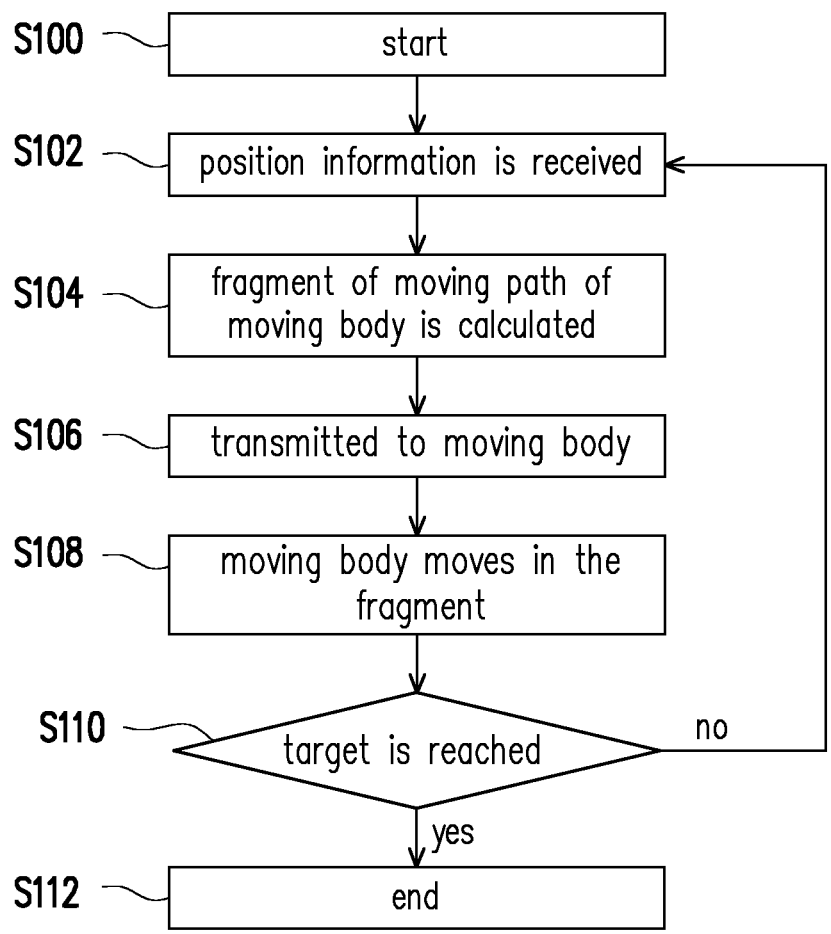
FIG. 4 is a schematic view of a process of a control method of the moving body of FIG. 1.

FIG. 3A to FIG. 3E are schematic views of a moving path of the moving body of FIG. 1. FIG. 4 is a schematic view of a process of a control method of the moving body of FIG. 1. Here, the fragmented calculation method of the moving path of the moving body 102 is illustrated with reference to FIG. 3A to FIG. 3E in conjunction with FIG. 4. In the embodiment, taking a target 50 (such as a predetermined destination) in a fixed state as an example, the position information of the moving body 102 may be obtained by the sensing positioning part 120 of FIG. 1 sensing and positioning the moving body 102. The position information of the target 50 may be a known position information stored in advance in the control part 110, a position information obtained by the sensing positioning part 120 sensing and positioning the target, or a position information obtained by the image detecting part 106 detecting the target, but is not limited herein. The control part 110 calculates a fragment of the moving path of the moving body 102 according to the position information of the moving body 102 and the position information of the target 50, and transmits the fragment to the moving body 102. That is, the control part 110 obtains the fragment of the moving path which the moving body 102 is required to move using the calculation method to be illustrated later and transmits to the moving body 102, causing the moving body 102 to move in the fragment. Through repeatedly executing the steps of calculating and transmitting, the moving body 102 repeatedly moves in the fragment until moves to the target.

Referring to FIG. 4, after the control method of the moving body starts (i.e., enters Step S100), firstly, in Step S102, the moving body 102 is sensed and positioned with the help of the sensing positioning part 120 of FIG. 1 to obtain the position information of the moving body 102.

Similarly, the target (for example, a destination or an object) may also be sensed and positioned with the help of the sensing positioning part 120 of FIG. 1 to obtain the position information of the target. However, the position information of the target may also be a known position information stored in advance in the control part 110 or a position information obtained by the image detecting part 106 detecting the target, and the disclosure is not limited thereto. Next, in Step S104, the control part 110 calculates a fragment of the moving path between the moving body 102 and the target 50 according to the position information of the moving body 102 and the target 50 (the calculation method is as illustrated later on), and then in Step S106, the fragment is transmitted to the moving body 102. Thus, in Step S108, the moving body 102 moves in the fragment.

Furthermore, the control part 110 determines the time section corresponding to the fragment of the planned path according to the response period (i.e., the reciprocal of the response frequency) of the sensing positioning part 120 relative to the control part 110. Also, the moving path and/or the fragment is a curve (as shown by the dashed curve in FIG. 3A) protruding towards the traveling direction of the moving body 102 (i.e., the direction of the velocity vector of the moving body 102, as shown by the direction along the dashed straight line in FIG. 3A pointing from the moving body 102 to the target 50) with respect to an imaginary straight line (as shown by the dashed straight line in FIG. 3A) connecting the moving body 102 and the target 50. That is, the control part 110 calculates a curve (as shown by the dashed curve in FIG. 3A) protruding towards the traveling direction of the moving body 102 with respect to an imaginary straight line (as shown by the dashed straight line in FIG. 3A) connecting the moving body 102 and the target 50, and uses the movement amount corresponding to the time section as the fragment (as indicated by the arrow in FIG. 3A). Thus, the moving body 102 moves in the fragment (i.e., from the starting point to the end point of the arrow in FIG. 3A), and the state shown in FIG. 3A is transitioned to the state shown in FIG. 3B.

After the moving body 102 moves in the fragment, the determining step of Step S110 is proceeded, that is, to determine whether the moving body 102 has reached the target 50. If not, the above Steps S102 to S108 are repeatedly executed in sequence, so that the control part 110 calculates the next fragment according to the position information of the moving body 102 and the target 50, and allows the moving body 102 to move in the next fragment. As such, the above Steps S102 to S108 are repeatedly executed as shown in the movement process of FIG. 3B to FIG. 3C, FIG. 3C to FIG. 3D, and FIG. 3D to FIG. 3E, and after the moving body 102 moves in the fragment, the determining step of Step S110 is proceeded. In the embodiment of FIG. 3A to FIG. 3E, until to the state of FIG. 3E, after the moving body 102 moves in the fragment, the moving body 102 reaches the target 50. At this time, in the determining step of Step S110, if it is determined that the target 50 has been reached, the finishing step of S112 is proceeded. As such, the control part 110 calculates a fragment of the moving path between the moving body 102 and the target according to the current position information of the moving body 102 and the target 50, transmits the fragment to the moving body, causing the moving body 102 to move in the fragment, and then determines whether to continue the next calculation. The above steps are repeatedly executed in sequence in the time section corresponding to each response period until the moving body 102 reaches the target 50.

In addition, although FIG. 3A to FIG. 3E are illustrated with the predetermined destination as the target 50, in the case where the position information of the target 50 is not known in advance or the target is in a moving state (i.e., the position information is not fixed), the current position information of the target 50 may still be obtained by the sensing positioning part 120 sensing and positioning the target, and transmitting to the control part 110 at any time. Thus, even if the position information of the target 50 is not known in advance or the target 50 is in a moving state, the control part 110 may still calculate the fragment of the moving path according to the current position information of the moving body 102 and the target 50, and transmit the fragment to the moving body 102, causing the moving body 102 to move in the fragment until the moving body 102 reaches the target 50.

Therefore, in the embodiment, the control system 100 of the moving body and the control method adopted thereby plan the moving path between the moving body 102 and the target in a fragmented manner, that is, the control part 110 may accurately calculate the fragment of each predetermined movement according to the current position information of the moving body 102 and the target, allowing the moving body 102 to stably move to the target, thereby providing the moving body with a more stable and accurate moving path. Although the control system 100 of the moving body and the control method adopted thereby plan the moving path between the moving body 102 and the target in a fragmented manner to allow the moving body 102 to move in the fragment each time until the fragment reaches the target, since the calculation speed of the control part 110 is extremely fast, the control part 110 is able to immediately transmit the calculated fragment to the moving body 102. Therefore, the movement of the moving body 102 is not cut into multiple fragmented actions and is a continuous movement behavior. As such, the moving body 102 is able to continuously move in the fragment, allowing the moving body 102 to stably and accurately move to the target.

Regarding the calculation method of the control part 110 calculating the fragment according to the position information of the moving body 102 and the target, the following illustration is provided as an example, but is not limited thereto. In the embodiment, the moving body 102 has a first driving wheel and a second driving wheel (for example, a left wheel or a right wheel, a front wheel or a rear wheel, or more than two driving wheels may be adopted), which are not shown, allowing the moving body 102 to move as a movement measure. The control part 110 calculates a movement parameter related to the moving body 102, such as an angular difference, an angular velocity, a velocity, etc. of the moving body 102 relative to the target 50 according to the direction vectors of the moving body 102 and the target, and calculates the moving velocities of the first driving wheel and the second driving wheel of the moving body 102 relative to the fragment according to the angular velocity and the velocity, thereby transmitting the fragment to the moving body 102, which then causes the moving body 102 to move in the fragment.

Further, in the embodiment, according to position information such as a direction vector $\vec{V}_m$ of the moving body 102, a direction vector $\vec{V}_g$ of the target 50 relative to the moving body 102, etc., the control part 110 may calculate an angular difference $\Delta\theta$ between the two from the following Equation 1, then calculate an angular velocity $\omega$ of the moving body 102 from the following Equation 2, or further calculate a velocity v of the driving part of the moving body 102. The control part 110 determines a time section Δt corresponding to a fragment of the planned path according to the response period (i.e., the reciprocal of the response frequency) of the sensing positioning part 120 relative to the control part 110, and calculates the fragment of the moving path between the moving body 102 and the target 50 accordingly. Therefore, the calculation equation of the angular velocity ω contains the time section Δt as a parameter. Moreover, in Equation 2, a $K_p$ value is a parameter based on the adjustment of the velocity difference within the angular range to be adjusted, and a $K_i$ value is a parameter required to compensate for the error in real time in the case where there is an error after the $K_p$ value is adjusted. In addition, the velocity v depends on the performance of the driving motor used by the moving body 102, thereby determining the maximum velocity v, but the disclosure is not limited thereto.

$$\Delta\theta = \cos^{-1}\left(\frac{\vec{V}_m \cdot \vec{V}_g}{|\vec{V}_m| \times |\vec{V}_g|}\right) \quad \text{Equation 1}$$

$$\omega = \Delta\theta \times K_p + \int_0^{\Delta t} \Delta\theta \times K_i \quad \text{Equation 2}$$

After calculating the movement parameters such as the angular difference Δθ, the angular velocity ω, the driving speed v, etc. of the moving body 102, together with the specification parameters of the moving body 102 (for example, a length l of the body of the moving body 102 and a diameter R of the driving wheel adopted by the moving body 102), the control part 110 calculates the respective moving velocities $V_R$ and $V_L$ of the first driving wheel and the second driving wheel (for example, the left wheel and the right wheel) of the moving body 102 according to the following Equation 3 and Equation 4, and transmits to the moving body 102.

$$V_L = \frac{2v - \omega \times l}{2R} \quad \text{Equation 3}$$

$$V_R = \frac{2v + \omega \times l}{2R} \quad \text{Equation 4}$$

Based on the calculation method, the control part 110 calculates the movement parameters such as the angular difference Δθ, the angular velocity ω, the driving speed v, etc. of the moving body 102, and further calculates the moving velocities $V_R$ and $V_L$ of the moving body 102 according to the position information of the moving body 102 (such as the direction vector $\vec{V}_m$, obtained by the sensing positioning part 120 sensing and positioning the moving body 102) and the position information of the target 50 (for example, the direction vector $\vec{V}_g$, which may be a known position information stored in advance in the control part 110, a position information obtained by the sensing positioning part 120 sensing and positioning the target, or a position information obtained by the image detecting part 106 detecting the target). Then, according to the moving velocities $V_R$ and $V_L$ of the moving body 102 and the corresponding time section Δt, the respective movement amounts of the first driving wheel and the second driving wheel of the moving body 102 may be calculated, thereby calculating a fragment of the moving path between the moving body 102 and the target 50, and the fragment is transmitted to the moving body 102, causing the moving body 102 to move in the fragment. The calculation method of the control part 110 is only one example of the disclosure. The control part 110 may also calculate the fragment by adopting other calculation methods and the disclosure is not limited thereto.

In addition, the above illustration is directed to an embodiment in which the moving body 102 does not encounter any obstacle during the movement, that is, the moving body 102 may move according to the fragment of the moving path planned by the control part 110 until reaching the target 50. However, when the moving body 102 encounters an obstacle during the movement process as shown in FIG. 3A to FIG. 3E, the moving body 102 may adopt an obstacle avoidance mode to avoid the obstacle. The obstacle avoidance mode in which the moving body 102 encounters an obstacle during the movement will be illustrated below in conjunction with the drawings.

Figure 5A:
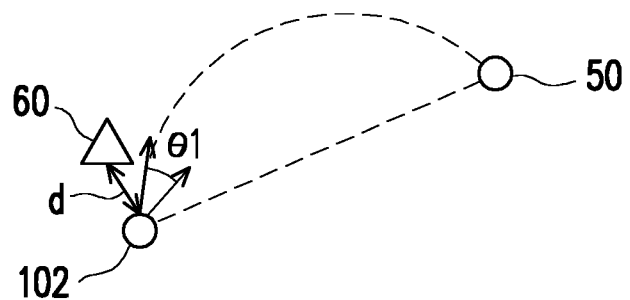
FIG. 5A to FIG. 5D are schematic views of an obstacle avoidance mode of the moving body of FIG. 1 when encountering an obstacle during movement.

FIG. 5A to FIG. 5D are schematic views of an obstacle avoidance mode of the moving body of FIG. 1 when encountering an obstacle during movement. In the embodiment, during the process of the moving body 102 moving in the fragment, the presence or absence of an obstacle 60 is detected by the moving body 102 and whether to start the obstacle avoidance mode is also decided by the moving body 102. During the process of the moving body 102 moving in the fragment, in the case where a distance d between the moving body 102 and the obstacle 60 is larger than a first distance, it can be considered that the moving body 102 and the obstacle 60 will not collide in the current state, so the moving body 102 does not start the obstacle avoidance mode and continues to move according to the fragment planned by the control part 110 or continues to move according to the next fragment recalculated by the control part 110 in the next time interval. However, when the moving body 102 moves in the fragment, in the case where the distance d between the moving body 102 and the obstacle 60 is equal to or smaller than the first distance (as in the state of FIG. 5A), the moving body 102 starts the obstacle avoidance mode. At this time, the moving body 102 moves in a direction (i.e., the direction indicated by another solid arrow in FIG. 5A) offset from the reverse side of the obstacle 60 by a first angle θ1 with reference to the traveling direction (the direction indicated by the solid arrow corresponding to the dashed curve in FIG. 5A) of the moving body 102. As such, the state of FIG. 5A is transitioned to the state of FIG. 5B.

Specifically, the obstacle avoidance mode refers to a mode of avoiding the obstacle 60. The so-called first distance refers to a safe distance between the moving body 102 and the obstacle 60, and the actual value adopted may be adjusted according to requirements. Although FIG. 5A shows the obstacle 60 as on the left side of the fragment of the moving path of the moving body 102, regardless of whether the obstacle 60 is present on the fragment of the moving path of the moving body 102 or on which side of the fragment, when the distance d between the moving body 102 and the obstacle 60 is equal to or smaller than the first distance, it means that the moving body 102 may collide with the obstacle 60 (for example, the side of the moving body 102 rubbing the obstacle 60). As such, when the moving body 102 moves in the fragment, in the case where the distance d between the moving body 102 and the obstacle 60 is equal to or smaller than the first distance, the moving body 102 moves in a direction (i.e., the direction indicated by another solid arrow in FIG. 5A) offset from the reverse side of the obstacle 60 by a first angle θ1 with reference to the traveling direction (the direction indicated by the solid arrow corresponding to the dashed curve in FIG. 5A) of the moving body 102, which ensures that the distance d between the moving body 102 and the obstacle 60 is extended towards the reverse side of the obstacle 60 to above the first distance as the safe distance. At this time, since the distance d between the moving body 102 and the obstacle 60 is larger than the first distance, the obstacle avoidance mode does not need to be executed. The control part 110 recalculates a fragment of a new moving path according to the current position information of the moving body 102 and the target 50 (as shown by the dashed straight line, the dashed curve, and the solid arrow in FIG. 5B corresponding to the calculation method of FIG. 3A to FIG. 3E), allowing the moving body 102 to continue moving toward the target 50 (even if the target 50 is in a moving state, it is also calculated according to the current position information of the target 50).

Figure 5B:
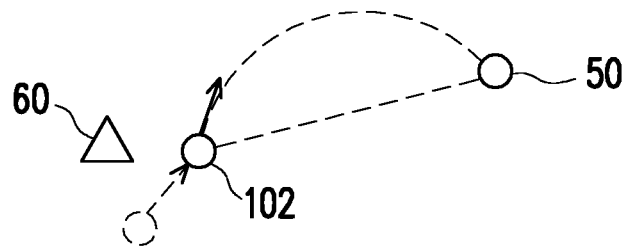
Figure 5C:
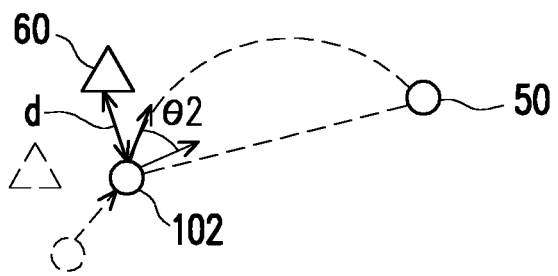

FIG. 5C represents the case where after the moving body 102 has started the obstacle avoidance mode according to the embodiment shown in FIG. 5A to move until the distance d between the moving body 102 and the obstacle 60 is larger than the first distance, during the process of the moving body 102 moving according to a fragment of the new moving path recalculated by the control part 110, the obstacle 60 is encountered again. As such, regarding the response period of the moving body 102 and the control part 110, in the case where the distance d between the moving body 102 and the obstacle 60 is equal to or smaller than the first distance within two consecutive response periods, the moving body 102 moves in a direction (i.e., the direction indicated by another solid arrow in FIG. 5C) offset from the reverse side of the obstacle 60 by a second angle θ2 larger than the first angle θ1 with reference to the traveling direction (i.e., the direction indicated by the solid arrow corresponding to the dashed curve in FIG. 5C) of the moving body 102. As such, the state of FIG. 5C is transitioned to the state of FIG. 5D.

Specifically, during the process of the moving body 102 moving in the fragment, in the case where the distance d between the moving body 102 and the obstacle 60 is equal to or smaller than the first distance within two consecutive response periods, it is conceivable that the area has multiple obstacles 60 or the obstacle 60 is in a moving state. At this time, the obstacle avoidance mode is different from the obstacle avoidance mode of FIG. 5A to FIG. 5B. The moving body 102 moves in a direction (i.e., the direction indicated by another solid arrow in FIG. 5C) offset from the reverse side of the obstacle 60 by a second angle θ2 larger than the first angle θ1 with reference to the traveling direction (the direction indicated by the solid arrow corresponding to the dashed curve in FIG. 5C) of the moving body 102, which ensures that the distance d between the moving body 102 and the obstacle 60 is extended towards the reverse side of the obstacle 60 to above the first distance as the safe distance, and further away from the obstacle 60 in the direction at the second angle θ2 larger than the first angle θ1.

Figure 5D:
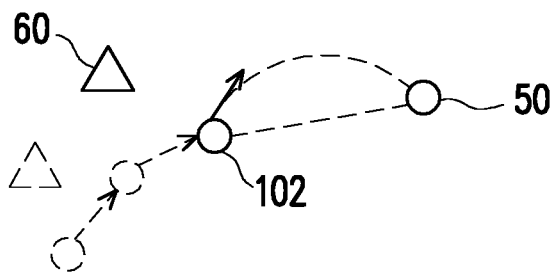

After transitioning from the state of FIG. 5C to the state of FIG. 5D, the distance d between the moving body 102 and the obstacle 60 is extended to above the first distance as the safety distance, so the obstacle avoidance mode does not need to be executed. At this time, the control part 110 recalculates a fragment of a new moving path according to the current position information of the moving body 102 and the target 50 (as shown by the dashed straight line, the dashed curve, and the solid arrow in FIG. 5D corresponding to the calculation method of the foregoing FIG. 3A to FIG. 3E), allowing the moving body 102 to continue moving towards the target 50 (even if the target 50 is in a moving state, it is also calculated according to the current position information of the target 50). However, if in the next response period of the moving body 102 and the control part 110, the case where the distance d between the moving body 102 and the obstacle 60 is equal to or smaller than the first distance (for example, there are multiple obstacles 60 or the obstacle 60 is in a moving state) during the movement of the moving body 102 still appears, the moving body 102 again adopts the obstacle avoidance mode of FIG. 5C to FIG. 5D to move in a direction offset from the reverse side of the obstacle 60 at the second angle θ2 larger than the first angle θ1 with reference to the traveling direction of the moving body 102 (the direction indicated by the solid arrow in FIG. 5D) to be further away from the obstacle 60.

Figure 6A:
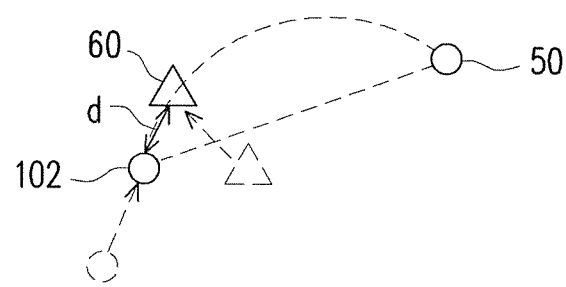
FIG. 6A and FIG. 6B are schematic views of another obstacle avoidance mode of the moving body of FIG. 1 when encountering an obstacle during movement.
Figure 6B:
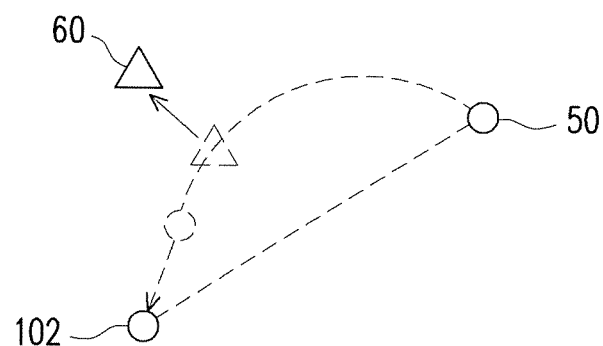

FIG. 6A and FIG. 6B are schematic views of another obstacle avoidance mode of the moving body of FIG. 1 when encountering an obstacle during movement. In the embodiment, when the moving body 102 moves in the fragment, in the case where the distance d between the moving body 102 and the obstacle 60 is equal to or smaller than the second distance (as in the state of FIG. 6A), the moving body 102 starts another obstacle avoidance mode. The so-called second distance is a distance even smaller than the first distance and the actual value may be adjusted according to requirements. Although FIG. 6A illustrates the obstacle 60 as on the fragment of the moving path of the moving body 102, regardless of whether the obstacle 60 exists on the fragment of the moving path of the moving body 102, when the distance d between the moving body 102 and the obstacle 60 is equal to or smaller than the second distance, the moving body 102 may collide with the obstacle 60 (for example, the side of the moving body 102 rubbing the obstacle 60). At this time, the moving body 102 reversely moves in the fragment back to a point on the fragment passed by the moving body 102. The state of FIG. 6A is transitioned to the state of FIG. 6B.

Specifically, since the second distance is a distance even smaller than the first distance, under normal circumstances, the moving body 102 can start the obstacle avoidance mode of FIG. 5A to FIG. 5D when the distance d between the moving body 102 and the obstacle 60 is equal to or smaller than the first distance. However, when the obstacle 60 suddenly approaching the moving body 102 appears in the process of the moving body 102 moving in the fragment (such as the obstacle 60 of FIG. 6A moving from the dashed line to the solid line to approach the moving body 102), or when the moving body 102 avoids a first obstacle using the obstacle avoidance mode of FIG. 5A to FIG. 5B or FIG. 5C to FIG. 5D causing the moving body 102 to suddenly approach another obstacle, the distance d between the moving body 102 and the obstacle 60 may suddenly become equal to or smaller than the second distance. At this time, since the moving body 102 is very close to the obstacle 60, if the obstacle avoidance mode of FIG. 5A to FIG. 5B or FIG. 5C to FIG. 5D is adopted, it is still possible that the moving body 102 and the obstacle 60 are not extended to above the safe distance and it is necessary to start the obstacle avoidance mode in the next response period. On this basis, since the moving body 102 just moved in the fragment at a previous time point, it can be ensured that there is no obstacle on the fragment. Therefore, in the case where the distance d between the moving body 102 and the obstacle 60 is equal to or smaller than the second distance even smaller than the first distance (as in the state of FIG.

6A), the moving body 102 reversely moves in the fragment back to a point on the fragment passed by the moving body 102.

Then, since the distance d between the moving body 102 and the obstacle 60 is larger than the first distance, the obstacle avoidance mode does not need to be executed. The control part 110 recalculates a fragment of the new moving path according to the current position information of the moving body 102 and the target 50 (such as the dashed straight line, the dashed curve, etc. in FIG. 6B corresponding to the calculation method of the foregoing FIG. 3A to FIG. 3E), allowing the moving body 102 to continue moving towards the target 50 (even if the target 50 is in a moving state, it is also calculated according to the current position information of the target 50). During this process, if the obstacle 60 is in a moving state and leaves the previous position, the moving body 102 may continue to move according to the fragment of the new moving path planned by the control part 110 (without executing the obstacle avoidance mode) until the target 50 is reached. If the obstacle 60 is in a fixed state and is in the previous position, since the obstacle 60 is not in a sudden situation, in the case where the distance d between the moving body 102 and the obstacle 60 is equal to or smaller than the first distance, the moving body 102 may start the obstacle avoidance mode of FIG. 5A to FIG. 5B (moving in a direction offset from the reverse side of the obstacle 60 by the first angle θ1 with reference to the traveling direction of the moving body 102) in the process of moving in the fragment, so that the moving body 102 is extended towards the reverse side of the obstacle 60 to above the first distance as the safe distance. Subsequently, the moving body 102 does not need to execute the obstacle avoidance mode. The control part 110 recalculates a fragment of the new moving path according to the current position information of the moving body 102 and the target 50, allowing the moving body 102 to continue moving towards the target 50 (even if the target 50 is in a moving state, it is also calculated according to the current position information of the target 50).

The obstacle avoidance modes of the moving body 102 described in FIG. 5A to FIG. 5D, and FIGS. 6A and 6B are illustrated using the case where the moving body 102 encounters the obstacle 60 in the process of moving in the fragment. However, when the control system 100 of the moving body according to the embodiment simultaneously controls multiple moving bodies (such as the moving bodies 102a and 102b in FIG. 2), wherein the moving body 102a may also be an obstacle to the other moving body 102b. Therefore, for implementation method of the control part 110 simultaneously controlling multiple moving bodies, each moving body may also adopt the obstacle avoidance mode to avoid the other moving body.

Specifically, if the obstacle avoidance mode including the moving body 102a as a first moving body and the moving body 102b as a second moving body is illustrated using the embodiment shown in FIG. 5A to FIG. 5B, in the case where the distance d between the first moving body (equivalent to the obstacle 60 of FIG. 5A to FIG. 5B) and the second moving body (equivalent to the moving body 102 of FIG. 5A to FIG. 5B) is equal to or smaller than the first distance, the second moving body (equivalent to the moving body 102 of FIG. 5A to FIG. 5B) moves in a direction (i.e. the direction indicated by another solid arrow in FIG. 5A) offset from the reverse side of the first moving body (equivalent to the obstacle 60 of FIG. 5A to FIG. 5B) at the angle θ1 with reference to the traveling direction (i.e., the direction indicated by the solid arrow corresponding to the dashed curve in FIG. 5A) of the second moving body. The state of FIG. 5A is transitioned to the state of FIG. 5B, allowing the distance between the second moving body and the first moving body to extend to above the first distance.

Similarly, if the obstacle avoidance mode including the moving body 102a as the first moving body and the moving body 102b as the second moving body is illustrated using the embodiment shown in FIG. 5C to FIG. 5D, in the case where the distance d between the second moving body (equivalent to the moving body 102 of FIG. 5C to FIG. 5D) and the first moving body (equivalent to the obstacle 60 of FIG. 5C to FIG. 5D) is equal to or smaller than the first distance within two consecutive response periods, the second moving body (equivalent to the moving body 102 of FIG. 5C to FIG. 5D) moves in a direction (i.e., the direction indicated by another solid arrow in FIG. 5C) offset from the reverse side of the first moving body (equivalent to the obstacle 60 of FIG. 5C to FIG. 5D) by the second angle θ2 larger than the first angle θ1 with reference to the traveling direction (i.e., the direction indicated by the solid arrow corresponding to the dashed curve in FIG. 5C) of the second moving body. The state of FIG. 5C is transitioned to the state of FIG. 5D.

Similarly, if the obstacle avoidance mode including the moving body 102a as the first moving body and the moving body 102b as the second moving body is illustrated using the embodiment shown in FIG. 6A to FIG. 6B, when the second moving body (equivalent to the moving body 102 of FIG. 6A to FIG. 6B) moves in the fragment, in the case where the distance d between the first moving body (equivalent to the obstacle 60 of FIG. 6A to FIG. 6B) and the second moving body (equivalent to the moving body 102 of FIG. 6A to FIG. 6B) is equal to or smaller than a second distance even smaller than the first distance (as in the state of FIG. 6A), the second moving body (equivalent to the moving body 102 of FIG. 6A to FIG. 6B) reversely moves in the fragment to a point on the fragment passed by the second moving body. The state of FIG. 6A is transitioned to the state of FIG. 6B.

After avoiding the first moving body (equivalent to the obstacle 60 of FIG. 5A to FIG. 5D or FIG. 6A to FIG. 6B) using the above obstacle avoidance mode, the distance d between the second moving body (equivalent to the moving body 102 of FIG. 5A to FIG. 5D or FIG. 6A to FIG. 6B) and the first moving body is larger than the first distance, so the obstacle avoidance mode does not need to be executed. The control part 110 recalculates a fragment of the new moving path according to the current position information of the second moving body and the target 50, allowing the second moving body to continue moving towards the corresponding target 50 (even if the target 50 is in a moving state, it is also calculated according to the current position information of the target 50).

Although the above embodiment is illustrated by taking the second moving body avoiding the first moving body as an example, vice versa, the first moving body may also avoid the second moving body using the above obstacle avoidance mode. Similarly, although the above embodiment is illustrated by equating the first moving body as the obstacle, regardless of whether the first moving body starts the obstacle avoidance mode to avoid the second moving body simultaneously when the second moving body starts the obstacle avoidance mode to avoid the first moving body, after the second moving body avoids the first moving body, the control part 110 may also recalculate a fragment of the new moving path according to the current position information of the first moving body and the target corresponding to the first moving body (which may be the same as or different from the target of the second moving body), allowing the first moving body to continue moving towards the target corresponding to the first moving body (even if the target is in a moving state, it is also calculated according to the current position information of the target). Therefore, in the embodiment, even if the control system 100 of the moving body simultaneously controls multiple moving bodies, each moving body 102 has the above obstacle avoidance function to avoid collision with the obstacle or other moving body.

Based on the above, the control method of the moving body and the control system of the moving body according to the disclosure allow the control part to calculate a fragment of the moving path between the moving body and the target according to the position information of the moving body and the target, and transmit the fragment to the moving body. Then, the steps are repeatedly executed in sequence until the moving body reaches the target. In addition, in the process of the moving body moving in the fragment, the moving body has an obstacle avoidance mode, which may effectively avoid an obstacle or avoid another moving body, and then a fragment of the moving path is planned again using in the aforementioned method. In this way, the control method of the moving body and the control system of the moving body according to the disclosure plan the moving path between the moving body and the target in a fragmented manner, thereby providing the moving body with a more stable and accurate moving path.

Finally, it should be noted that the above embodiments are only intended to illustrate the technical solution of the disclosure, but not to limit the disclosure. Even though the disclosure has been illustrated in detail with reference to the aforementioned embodiments, persons skilled in the art should understand that modifications may still be made to the technical solution recited by the aforementioned embodiments or equivalent replacements may still be made to the some or all of the technical features thereof. However, the modifications or replacements will not cause the spirit of the corresponding technical solution to depart from the scope of the technical solution according to the various embodiments of the disclosure.

What is claimed is:

1. A control method of a moving body, wherein the control method is adapted to control a moving body by a controller of a control system in which the moving body is moved to reach a target, wherein the controller of the control system is disposed at a back end configured at a position different from a position of the moving body and a position of the target,
   wherein in the control method of a moving body, the controller is allowed to repeatedly execute following steps in sequence until the moving body reaches the target, the steps comprising:
   obtaining a position information of the moving body and a position information of the target;
   calculating a fragment of a moving path between the moving body and the target according to the position information of the moving body and the position information of the target;
   transmitting the fragment to the moving body, so that the moving body is moved along the fragment; and
   calculating the fragment of the moving path between the moving body and the target according to a response period of obtaining the position information of the moving body and the position information of the target relative to the controller,
   wherein when the moving body moves in the fragment, in a case where a distance between the moving body and an obstacle is equal to or smaller than a first distance,
   the moving body moves in a direction offset from a reverse side of the obstacle by a first angle with reference to a traveling direction of the moving body,
   wherein the moving path and/or the fragment is a curve protruding towards a traveling direction of the moving body with respect to an imaginary straight line connecting the moving body and the target,
   wherein when the moving body moves in the fragment, presence or absence of the obstacle is detected by the moving body and whether to start an obstacle avoidance mode is determined by the moving body.

2. The control method of a moving body according to claim 1, wherein the moving body has a first driving wheel and a second driving wheel which allow the moving body to move,
   the control method of a moving body further comprises the controller calculating an angular difference, an angular velocity, and a velocity of the moving body relative to the target according to direction vectors of the moving body and the target, and calculates moving velocities of the first driving wheel and the second driving wheel of the moving body corresponding to the fragment according to the angular velocity and the velocity, so as to transmit the fragment to the moving body.

3. The control method of a moving body according to claim 1, wherein the position information of the moving body and the position information of the target are obtained from a sensing element mounted on the moving body and the target.

4. The control method of a moving body according to claim 1, wherein the moving body has an image detecting part, in a case where the image detecting part detects the target, and the control method of a moving body further comprising the controller calculating the fragment according to the position information of the moving body and the position information of the target detected by the image detecting part.

5. The control method of a moving body according to claim 1, wherein regarding the response period of the moving body and the controller, in a case where a distance between the moving body and the obstacle is equal to or smaller than the first distance within two consecutive response periods, the moving body moves in a direction offset from a reverse side of the obstacle by a second angle larger than the first angle with reference to a traveling direction of the moving body.

6. The control method of a moving body according to claim 1, wherein when the moving body moves in the fragment, in a case where a distance between the moving body and an obstacle is equal to or smaller than a second distance, the moving body reversely moves in the fragment back to a point on the fragment passed by the moving body.

7. The control method of a moving body according to claim 1, wherein the control system comprises a first moving body and a second moving body, in a case where a distance between the first moving body and the second moving body is equal to or smaller than the first distance, the second moving body moves in a direction offset from the reverse side of the first moving body by the first angle with reference to a traveling direction of the second moving body.

8. The control method of a moving body according to claim 1, wherein the control system comprises a first moving body and a second moving body, in a case where a distance between the first moving body and the second moving body is equal to or smaller than a second distance, the second moving body reversely moves in the fragment passed by the second moving body back to a point on the fragment passed by the second moving body.

9. The control method of a moving body according to claim 1, wherein the fragment is a movement amount corresponding to a time section.

10. The control method of a moving body according to claim 9, further comprising the controller determining the time section corresponding to the fragment of a planned path according the response period of obtaining the position information of the moving body and the position information of the target relative to the controller.

11. A control system of a moving body, wherein the control system is adapted to control a moving body and the moving body is moved to reach a target, the control system comprising:
  a controller, disposed at a back end configured at a position different from a position of the moving body and a position of the target;
  wherein the controller is configured for repeatedly executing following steps in sequence until the moving body reaches the target, the steps comprising:
  obtaining a position information of the moving body and a position information of the target;
  calculating a fragment of a moving path between the moving body and the target according to the position information of the moving body and the position information of the target;
  transmitting the fragment to the moving body, so that the moving body is moved along the fragment; and
  calculating the fragment of the moving path between the moving body and the target according to a response period of obtaining the position information of the moving body and the position information of the target relative to the controller,
  wherein when the moving body moves in the fragment, in a case where a distance between the moving body and an obstacle is equal to or smaller than a first distance, the moving body moves in a direction offset from a reverse side of the obstacle by a first angle with reference to a traveling direction of the moving body,
  wherein the moving path and/or the fragment is a curve protruding towards a traveling direction of the moving body with respect to an imaginary straight line connecting the moving body and the target,
  wherein when the moving body moves in the fragment, presence or absence of the obstacle is detected by the moving body and whether to start an obstacle avoidance mode is determined by the moving body.

12. The control system of a moving body according to claim 11, wherein the moving body has a first driving wheel and a second driving wheel which allow the moving body to move, the controller calculates an angular difference, an angular velocity, and a velocity of the moving body relative to the target according to direction vectors of the moving body and the target, and calculates moving velocities of the first driving wheel and the second driving wheel of the moving body corresponding to the fragment according to the angular velocity and the velocity, so as to transmit the fragment to the moving body.

13. The control system of a moving body according to claim 11, wherein the moving body has an image detecting part, in a case where the image detecting part detects the target, the controller calculates the fragment according to the position information of the moving body and the position information of the target detected by the image detecting part.

14. The control system of a moving body according to claim 11, wherein when the moving body moves in the fragment, in a case where a distance between the moving body and an obstacle is equal to or smaller than a second distance, the moving body reversely moves in the fragment back to a point on the fragment passed by the moving body.

15. The control system of a moving body according to claim 11, wherein the control system comprises a first moving body and a second moving body, in a case where a distance between the first moving body and the second moving body is equal to or smaller than the first distance, the second moving body moves in a direction offset from the reverse side of the first moving body by the first angle with reference to a traveling direction of the second moving body.

16. The control system of a moving body according to claim 11, wherein the control system comprises a first moving body and a second moving body, in a case where a distance between the first moving body and the second moving body is equal to or smaller than a second distance, the second moving body reversely moves in the fragment passed by the second moving body back to a point on the fragment passed by the second moving body.

* * * * *